United States Patent [19]

Jones et al.

[11] 3,929,570

[45] Dec. 30, 1975

[54] FAILED FUEL DETECTION FOR PWR

[75] Inventors: Cecil R. Jones, Orange, Conn.;
Alfred H. Yoli, New City, N.Y.;
William F. Kirk, Orange, Conn.

[73] Assignee: Transfer Systems Incorporated,
North Haven, Conn.

[22] Filed: Jan. 14, 1974

[21] Appl. No.: 432,902

[52] U.S. Cl. .................................. 176/80; 73/411
[51] Int. Cl. ................................................ G21c 3/10
[58] Field of Search ............. 73/411, 412; 176/19 R,
176/19 LD, 68, 79, 80

[56] References Cited
UNITED STATES PATENTS

| | | | |
|---|---|---|---|
| 2,598,932 | 6/1952 | Natho | 73/411 |
| 2,882,503 | 4/1959 | Huff et al. | 73/411 |
| 3,140,614 | 7/1964 | Willis | 73/411 |
| 3,321,370 | 5/1967 | Oppenheimer | 176/80 |
| 3,823,068 | 7/1974 | Worlton et al. | 176/80 |

FOREIGN PATENTS OR APPLICATIONS 491,881    9/1938    United Kingdom ................... 73/411

Primary Examiner—Stephen C. Bentley

[57] ABSTRACT

Apparatus for improved detection of failed fuel especially in a pressurized water type of nuclear reactor is described. Each fuel rod is provided with a pressure sensitive assembly which responds to perssure changes by rotation of a magnetic element. The fuel rods are housed in an assembly having a removable upper fitting and which allows access through the fitting by a detector to the magnetic element of each fuel rod to sense its radial position and thus its internal pressurization, and by this means the condition of the fuel.

8 Claims, 8 Drawing Figures

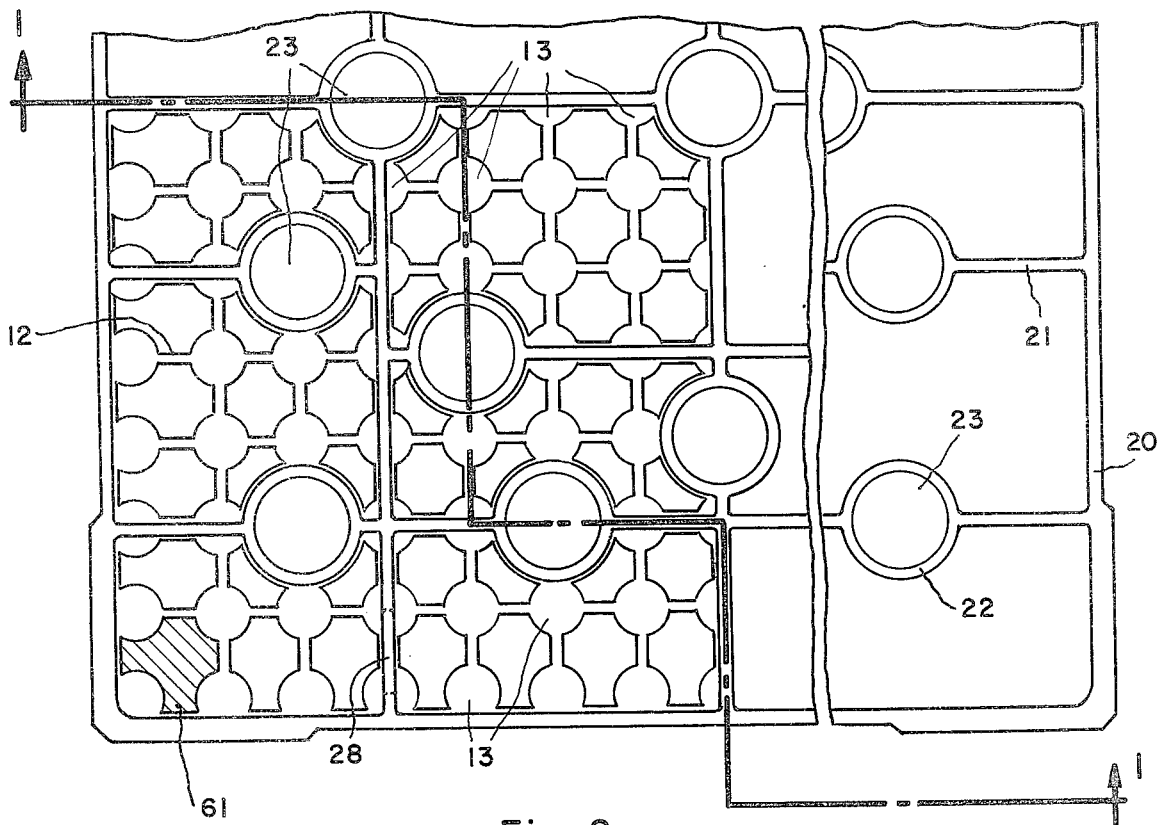
Fig. 2
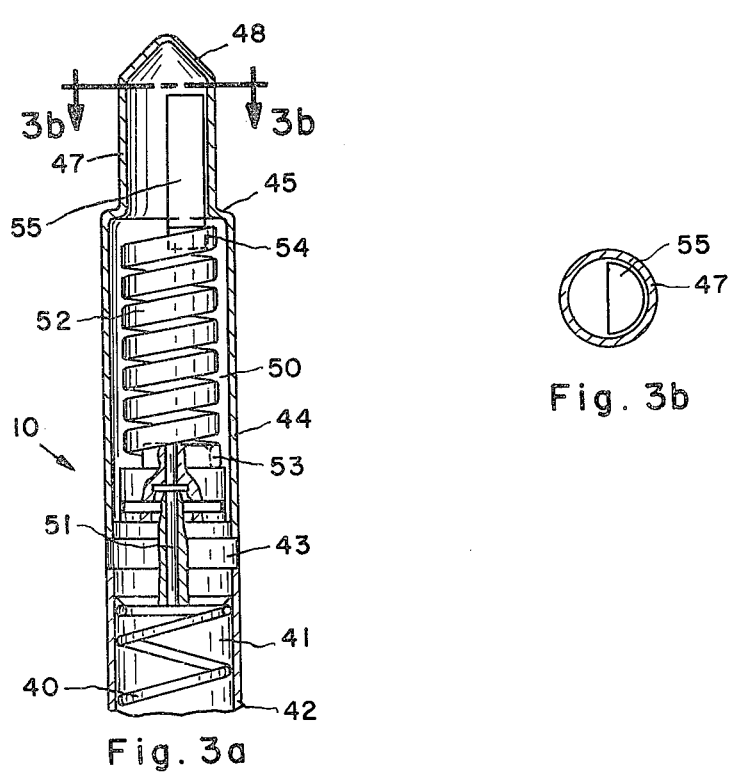
Fig. 3a
Fig. 3b

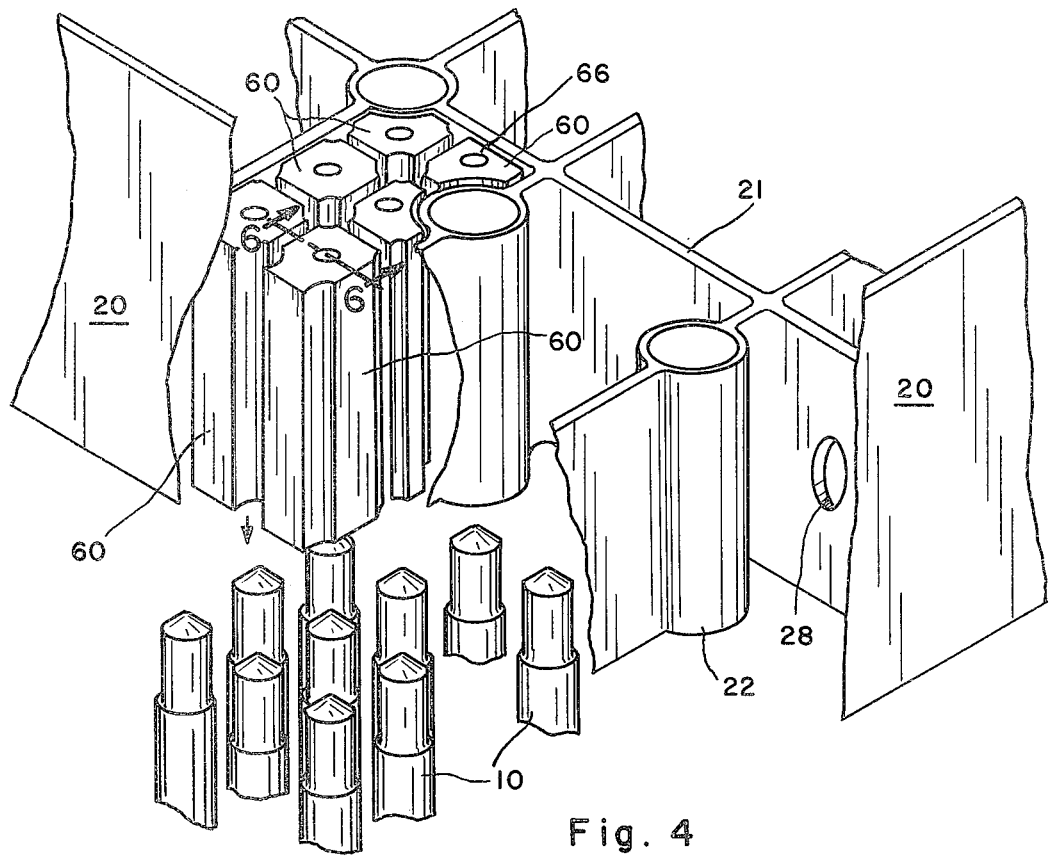
Fig. 4
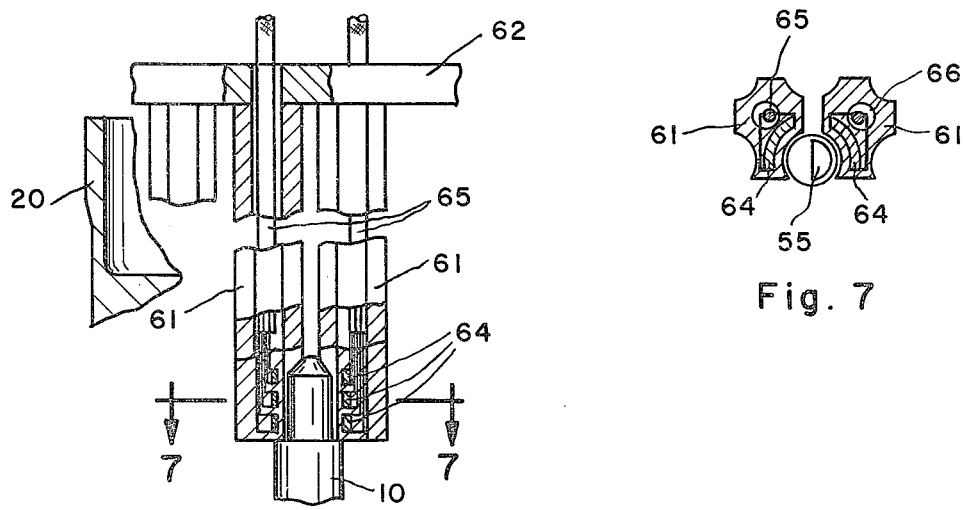
Fig. 6
Fig. 7

FAILED FUEL DETECTION FOR PWR

This invention relates to devices and apparatus which allow for detection of failed fuel in a power generating nuclear reactor, and especially to such devices and apparatus for use in light water reactors of the pressurized water type (PWR).

A commonly assigned copending application, Ser. No. 303,548, filed Nov. 3, 1972, now U.S. Pat. No. 3,813,235 describes a failure indicator for a nuclear reactor fuel element which comprises a longitudinally movable indicator pin biased under spring pressure toward a failed fuel position but maintained in its safe fuel position by internal fuel element pressurization. Should the fuel rod cladding fail, the resultant change in pressurization causes movement of the indicator pin toward its failed fuel position. A magnetic member is connected to the indicator pin and its position is magnetically sensed to determine the presence of failed fuel. This approach is readily applicable to a fuel assembly for a boiling water type of reactor (BWR) by allowing the movable pin ends of the fuel rods to protrude through the openings in the upper end fitting of the fuel assembly thereby allowing them to be accessed from the top by the detector while the fuel rods remain within the assembly. With a fuel assembly having a removable upper end fitting, when the defective rod has been located, the end fitting can be removed and the defective rod replaced.

The above-described system is not similarly applicable to a typical PWR whose fuel rods terminate below the upper end fitting and thus cannot all be accessed by the pin position detector from above. In said copending application, Ser. No. 303,548, now U.S. Pat. No. 3,813,235 it is thus proposed to invert the pressure sensitive assembly and mount it at the bottom end of each of the fuel rods, which would more readily allow access thereto by the detector from the bottom side of the assembly.

The present invention is directed to a modified pressure sensitive assembly for a fuel rod which permits the application of failed fuel detection techniques to a larger variety of fuel assembly geometries and reactor systems. In accordance with the present invention, the indicator responds to fuel rod pressure changes by rotating within the assembly rather than by moving longitudinally. A non-circular-symmetrical magnetic member is coupled to the indicator and rotates therewith. To sense rotation, the fuel assembly is constructed such that the detector can be positioned alongside the rod end containing the rotatable magnetic member. With a properly designed fuel assembly, access to the pressure-sensitive indicators is provided through the coolant openings in the upper end fitting.

In a preferred embodiment in accordance with the invention, the pressure sensitive assembly comprises a spiral or helical sealed Bourdon tube pressurized to a level below that of the fuel rod itself which is completely enclosed within an extension of the fuel rod containment. As fuel rod pressurization changes, a free end of the Bourdon tube rotates, carrying with it a soft magnetic member in pie-shaped form.

In accordance with another feature of the invention, the above described fuel rods each with its own rotatable indicator are employed in a fuel assembly having a removable upper end fitting which is provided with coolant openings such that every fuel rod, viewed directly from above through coolant openings in the upper end fitting, has exposed and thus accessible to a detector a sector of its periphery of about one-eighth or more. This is sufficient to determine the radial position of the magnetic material of the rotatable member by a detector positioned alongside.

These and further features and advantages of the invention will be better understood with reference to the accompanying drawings wherein:

FIG. 2 is a top view of the upper end fitting of approximately one-half of the fuel assembly of FIG. 1, the left quadrant also showing a typical fuel rod spacer located below the upper end fitting;

FIG. 3a is a partly cross-sectional, partly elevational view of the upper end of a fuel rod in accordance with the invention;

FIG. 3b is a cross-sectional view along the line 3b—3b of the fuel rod of FIG. 3a;

FIGS. 4 and 5 are perspective views of part of the fuel assembly of FIG. 1 illustrating how access is had by a detector to the fuel rods in accordance with the invention;

FIG. 6 is a schematic, cross-sectional view along the line 6—6 of FIG. 4 showing the internal construction of one form of detector in accordance with the invention;

FIG. 7 is a cross-sectional view along the line 7—7 of FIG. 6

Reference is made to copending application, Ser. No. 225,406, filed Feb. 11, 1972, the contents of which are hereby incorporated herein, which describes an improved fuel assembly for a PWR featuring a removable upper end fitting allowing on-site access to and removal of individual fuel rods. In such construction, as well as in other known constructions, a typical PWR fuel assembly comprises an open supporting frame made up of a plurality of parallel hollow guide tubes secured at opposite ends to upper and lower end fittings. Secured to the guide tubes in intermediate positions in vertically spaced planes are a plurality of apertured grid spacers. The nuclear fuel elements are in the form of elongated rods or pins generally comprising a hollow tube of zirconium or a zirconium alloy packed with radioactive pellets such as $UO_2$ pellets. The fuel rods form a bundle of spaced, parallel, vertically disposed rods with each individually positioned and held within the frame within aligned apertures of the spacer grids between the end fittings. A plurality of such assemblies are mounted within the reactor core. The guide tubes are designed to accommodate a suitable control rod assembly to control the neutron flux density during operation. The heat generated by the radioactive material is transferred to a coolant, typically light water, pumped vertically through the assembly from below and in heat transfer contact with each of the fuel pins. In the improved construction of application Ser. No. 225,406, fastening means removable from the top secure the upper end fitting to the guide tubes, whereby the load path for lifting the assembly extends from the upper end fitting through the fastening means and via the guide tubes to the lower end fitting to which they are anchored. The fuel rods are carried by the lower end fitting.

Figure 1:
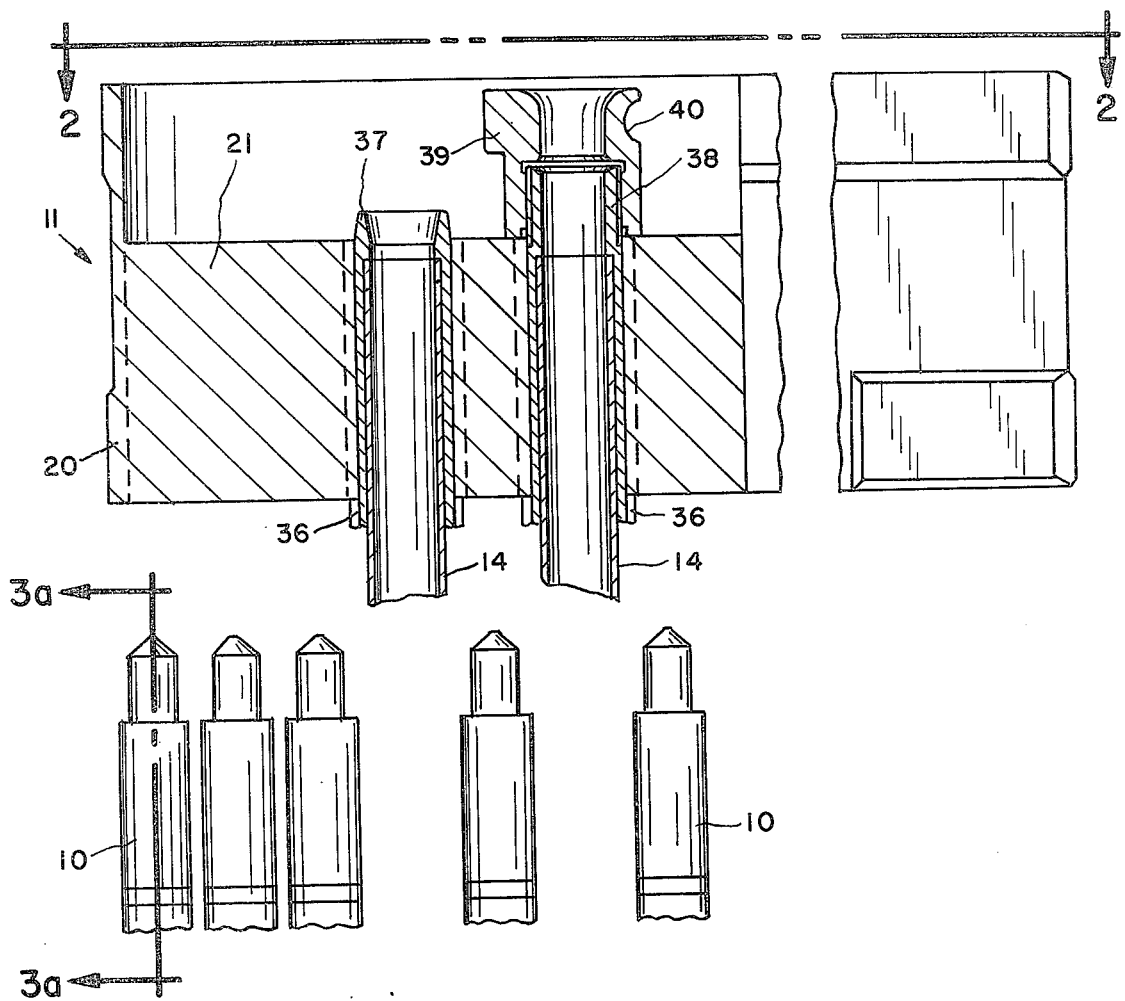
FIG. 1 is a partly elevational, partly cross-sectional view of part of the upper end of a fuel assembly in accordance with the invention for a PWR.

A similar construction is employed in the fuel assembly in accordance with the present invention, the upper part of which is illustrated in FIG. 1. It comprises an open supporting frame for a plurality of fuel elements generally in the form of fuel rods or fuel pins 10, only some of which are shown. Each of the fuel rods 10 may comprise for example a hollow tube of a zirconium alloy enclosing $UO_2$ pellets. A typical rod has a diameter of about one-quarter inch and a length of about ten feet. The fuel rod supporting frame comprises upper 11 and lower (not shown) end fittings and a plurality of spacer grids 12 joined together by a plurality of control rod guide tubes 14. Typically, these assembly parts are of non-corrosive material, such as stainless steel or zirconium. The spacer grids 12 are of conventional construction, for example, eggcrate construction, containing an array of apertures for receiving the fuel rods 10, which pass freely therethrough. The guide tubes 14 are permanently secured as by welding or brazing to the spacer grids 12 to form a rigid construction. Typically six to eight spacer grids will be present. The guide tubes 14 are also permanently secured to the lower end fitting.

The upper end fitting 11 is removably secured to the guide tubes 14. The upper fitting, which is of one-piece construction, is a generally square apertured plate with a solid periphery 20 and an internal webb 21 with enlarged circular portions 22 providing openings 23 to receive the upper ends of the guide tubes, and the remainder of the plate is cut away to provide access from the top over at least one-eighth of its periphery to each and every fuel rod within the assembly. FIG. 2 is a top plan view of slightly over two quadrants of the fuel assembly upper end fitting showing in the right quadrant the plate with its guide tube receiving apertures 23. The left quadrant shows the spacer 12 below the upper end fitting with its array of holes 13 for accommodating the fuel rods. As will be observed, viewed from the top, access is available to all of the fuel rods. The remaining two quadrants are similar.

The upper end fitting 11 is removably secured to the upper ends of the guide tubes 14 by suitable fastening means, one form of which is illustrated in FIG. 1. To the ends of the guide tubes 14 is brazed a sleeve with a lower flange 36 on which the fitting 11 rests but the sleeves on the guide tubes 14 adjacent the periphery 20, designated 37, are shorter with a smooth surface, which slip freely through the aligned apertures 23 of the fitting 11, whereas the remaining sleeves, designated 38, are taller and have a threaded end to receive a locking nut 39 for securing the fitting 11 to the guide tubes 14. The nuts 39 have a fluted top 40 to be received by a grapple or special tool (not shown) capable of removing the nut from the top.

For removing the fuel assembly from the core, recesses or holes 28 are provided in the webb 21 of the fitting 11 for receiving the fingers of a suitable lifting grapple (not shown). The shorter sleeves 37 affixed to the adjacent guide tubes provide more room for access by the grapple to the lifting recesses 28. In the embodiment shown, four recesses 28 are provided.

Each of the fuel rods 10 contains at its upper end a pressure sensitive or responsive indicator which is completely enclosed in the manner described in copending application, Ser. No. 303,548. Now U.S. Pat. No. 3,813,235 FIG. 3a is a view of the upper end of the fuel rod 10. Below the part shown would be the $UO_2$ pellets held in place by a spring 40 providing a gas plenum region 41 within the fuel rod housing or containment 42. The pressure sensitive assembly comprises a base member 43 which is brazed or welded to the fuel rod containment 42 and provides an upwardly extending, sealed, cylindrical containment extension 44 forming about ⅔ of the way up a locating shoulder 45 above which extends upward a reduced diameter cylindrical extension 47 terminating in a tapered top 48. In order to provide a convenient means for gripping the fuel rod 10 to remove same from the assembly, an annular groove or recess (not shown) may be provided in the containment wall 44. If no lifting recess is provided, a removal tool with a gripping collet end may be provided. The base member 43 separates the gas plenum 41 from a sealed chamber 50 above, but communication is provided by a drilled hole 51 extending vertically through the base member. Thus the gas pressure within the chamber 50 is the same as that within the gas plenum 41.

Mounted on the base member is a sealed helically-wound Bourdon tube 52. As shown, the bottom end 53 of the Bourdon tube 52 is secured as by brazing or welding to a pedestal portion on the base member 43. The Bourdon tube 52 spirals upward around a central axis, which also is the longitudinal central axis of the extension 44 and fuel rod 10, and to its free end 54 at the top is secured a member 55 of ferromagnetic material, such as soft iron. As will be noted, the magnetic member 55 extends mainly within the reduced diameter extension 47, and has a non-circular-symmetrical shape or cross-section. In the embodiment illustrated, the shape is semi-circular, with however the center of the semi-circle aligned with the longitudinal axis of the fuel rod, with the result that the bulk of the magnetic material is located to one side of the axis within the reduced diameter extension. The actual radial position occupied by the magnetic member is determined by the pressure difference between the inside of the Bourdon tube 52 and the chamber 50 pressure. As mentioned earlier, the chamber pressure is that of the gas plenum, which in a typical fuel rod is pressurized to about 200–300 psi. This value tends to increase during burnup due to the release of gaseous fission products. The Bourdon tube is conveniently sealed at atmospheric pressure. The free end occupies a radial position depending upon the pressure difference and construction parameters. As the pressure difference varies, the free end 54 rotates about the central axis in proportion to the change in pressure thereby changing the radial position of the magnetic member 55. It is preferred to choose the construction parameters of the tube 52 such that the magnetic member rotates approximately 180° when the gas plenum pressure falls to atmospheric, which is that of the surrounding coolant at shutdown with failure of the fuel element containment. The pressure differential also changes continuously during reactor operation even without containment leaks resulting from fission product buildup. Thus, determining the radial position of the magnetic member 55 mades it possible to detect not only a leaking fuel rod, but also obtain information about the fuel rod during its working lifetime.

The radial position of the magnetic member 55 can be determined in a number of different ways. A preferred sensor is a differential transformer, which comprises one or more, preferably three, electrical coil windings mounted in a probe member such that when positioned with respect to the pressure-sensitive end of the fuel rod will establish magnetic coupling between the windings whose value depends upon the radial position of the magnetic member. As the radial position varies, the magnetic coupling changes causing the generation of a changed electrical signal from the probe which can be transmitted to a remote location. It will be understood that the pressure sensitive assembly containment must be of non-magnetic material to permit magnetic sensing of the radial position of the magnetic member. A suitable material is zirconium or a zirconium alloy.

In practice, each fuel rod can be sensed by using a single probe designed to fit over the reduced diameter extension 47 and between neighboring fuel rods while the fuel rod remains within the assembly. The shoulder 45 or tapered top 48 can be employed to locate the probe relative to the magnetic member 55. The reduced diameter extension 47 provides the additional space needed between neighboring rods to accommodate the probe while the rods remain within the assembly. In this manner of carrying out the invention, the upper end fitting 11 would have to be removed to allow access by the probe to the reduced diameter extensions of all of the fuel rods. However, it is preferred to sense each fuel rod without removing the upper end fitting. This can be accomplished by inserting an individual probe through the webb openings in the upper end fitting to a position alongside each of the fuel rods in turn. This may require a modified arrangement of the coil windings in the probe to enable detection of the radial position of the magnetic member wherever located. Since the magnetic member radial positions are not necessarily the same for all fuel rods, it is preferred to sense and record the radial position for each fuel rod when placed into service by means of the magnitude of generated electrical signal, to provide a better comparison for determining a changed position of the magnetic member. As will be observed from the top view of FIG. 2, each and every fuel rod while located in the assembly, by reason of the construction of the upper end fitting, has at least one-eighth of its periphery accessible from the top through the webb openings in the top plate. Thus, a differential transformer probe can be located alongside all of the fuel rods in a position to determine whether or not a change in the radial position of the magnetic member has occured.

In view of the large number of fuel rods present in a fuel assembly, and the large number of fuel assemblies in a core, it is desirable to sense the condition of more than one fuel rod at a time. In a preferred arrangement, all of the fuel rods in an assembly can have their pressure conditions sensed by means of a multiple sensor construction. As is clear from FIG. 2, a multiple sensor requires a construction designed to fit within the annular rim 20 of the upper end fitting 11 such that multiple probes depending downward therefrom can fit within the webb openings such that each probe with incorporated coil windings is located alongside at least one pressure-sensitive end of a fuel rod and such that all fuel rods present can have the position of their internal magnetic member sensed.

Figure 5:
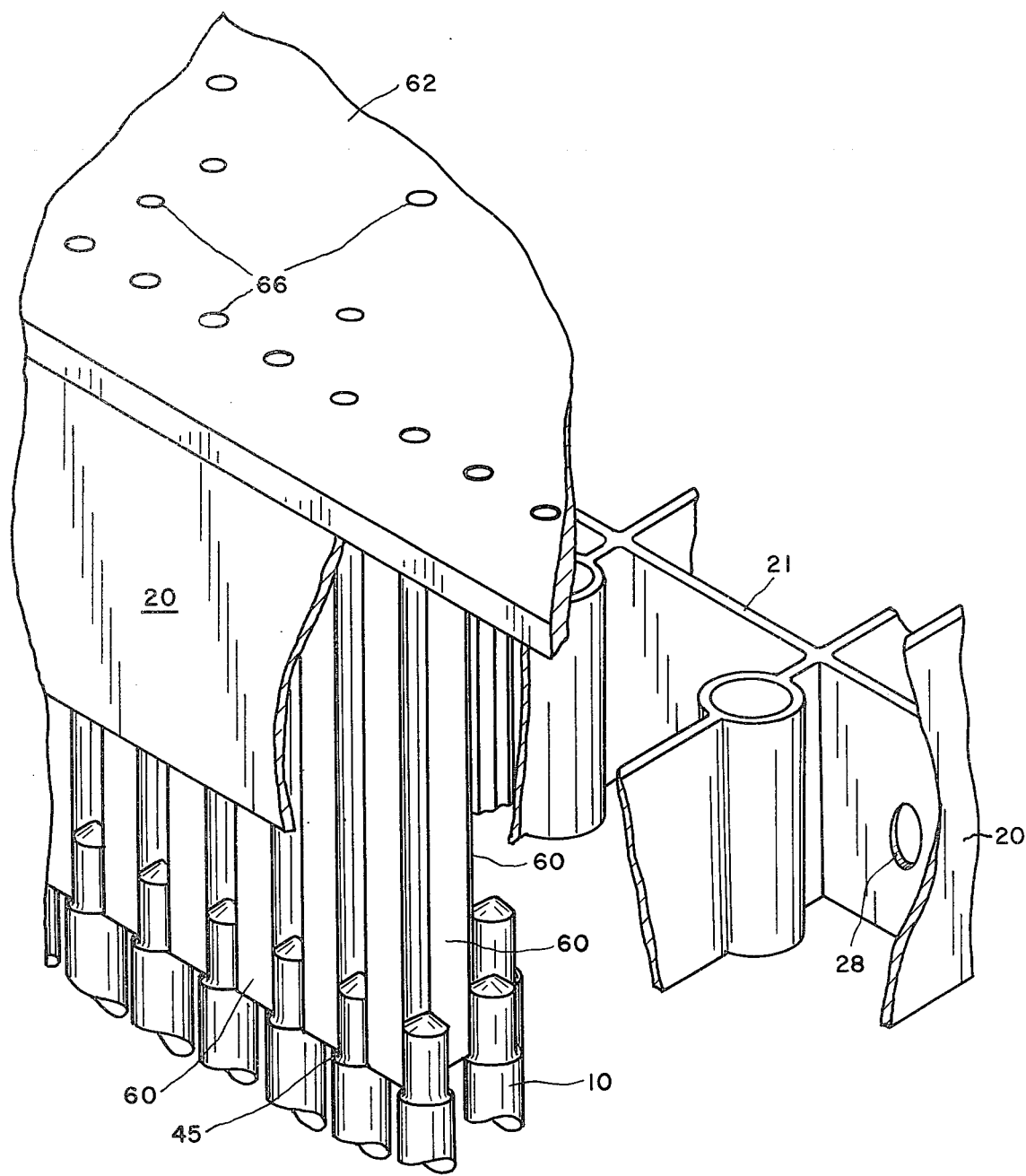

One form of detector assembly is illustrated in FIGS. 4 and 5. FIG. 4 is a perspective view of part of the fuel assembly showing the upper end fitting periphery 20 and inner webb construction 21. The detector comprises multiple probes 60 each comprising a solid body configured to fit within the end fitting openings and around the fuel rods. A cross-section of one configuration is illustrated by the hatched area designated 61 in FIG. 2. FIG. 4 illustrates the detector being lowered through the upper end fitting onto the fuel rods. FIG. 5 illustrates the detector assembly after it has seated itself on the shoulders 45 of the fuel rods 10. The multiple probes 60 are conveniently suspended from a common upper support plate 62, which is supported in turn from above by any suitable hoist.

As shown in FIGS. 6 and 7, each probe 61 contains at least one, and preferably three, windings 64 embedded in its base and constituting part of a differential transformer. Each winding forms a sector of a circle occupying at least 45°, or one-eighth of a complete circle. In the example illustrated in FIG. 2, the winding arc is about 70°. The winding leads form a winding harnesses 65 which extend through vertical holes 66 in each probe 61 and which also passes through the supporting plate 62. As will be observed in FIG. 6, the probe windings are located with respect to the rotatable magnetic member 55 by the shoulder 45 on the fuel rod extensions 47. As illustrated in FIG. 7, the location of the magnetic member 55 will determine the magnetic coupling between the windings in each probe, and thus determine the magnitude of an electrical signal at any desired remote location. In FIG. 7, both sets of windings are shown sensing the same fuel rod. However, it will be evident that each fuel rod requires only a single differential transformer to sense its failure indicator. This can be accomplished by providing a single probe with one set of windings for each fuel rod, or probes with multiple sets of windings for use with multiple fuel rods.

The Bourdon tube 52 responds to pressure changes by rotation of its end about its central axis. To perform this function, one is not limited to the helical construction shown. Any sealed, flexible tube which can be bent into a curve or arc and which in response to pressure changes will produce a rotation can be employed in place of the tube illustrated. For instance, a spiral or twisted configuration is also suitable. In all cases, the angle of rotation is usually proportional to the applied pressure. The total amount of rotation achieved is readily controlled by the number of turns chosen for the Bourdon tube. The shape of the magnetic member and the winding geometry of the differential transformer can be chosen to obtain a desired output relation to magnetic rotation. The instrument sensitivity is remarkably high. Very small changes in angular displacement as low as a fraction of a degree are readily detected. Nulling systems are readily implemented to provide an automatic warning signal should the magnetic rotation exceed a preset value. The material for the Bourdon tube may be of any composition that will provide the required flexibility to permit movement. Preferably a metal is used, for example, a spring metal such as Iconel-X.

Various techniques can be employed to locate the detector assembly relative to the fuel assembly. For instance, alignment means can be mounted on the holding plate 62 for the probes such that as the holding plate is lowered, the probes become aligned with the spaces between the fuel rods. Of course, the control rod assembly must be removed from the fuel assembly. With the use of a grapple mast for the fuel assembly, the control rods can be withdrawn into the mast and then the mast location used as a guide to locate the detector assembly over the fuel assembly. For instance, the detector assembly can be mounted on the mast in a position to be rotated under the mast and over the fuel assembly before lowering into position. Since it is not necessary to change horizontal location of the mast, the operation of detecting failed fuel can be accomplished quickly.

While it is preferred for the rod condition indicator of FIG. 3a to be located at the top of the fuel rod as described, it is also possible to provide same at the bottom end of the fuel element. In order to obtain access to the rod condition indicator at the bottom, it will be necessary to modify the construction of the lower end fitting such that the reduced diameter rod ends protrude through openings in the lower end fitting and are thus accessible to probes applied from the bottom, after the fuel assembly has been lifted up to provide room for positioning of the detector below it. As before, the mast can be used as a guide for locating the detector relative to the fuel assembly under investigation.

When failed fuel rods are detected, they should be removed and replaced with safe units. The procedure for removing individual fuel rods 10 is as follows. A grapple is brought down and secured to the fuel assembly and then the latter lifted out and placed in a storage pool. Next, all of the guide tube nuts 39 are removed, and the upper plate 11 can be lifted off and removed. Now all of the fuel rods 10 are accessible from the top and selected ones can be removed as desired by means of a special tool (not shown) for gripping the upper ends of the fuel rods and lifting same out of the spacers. After the defective fuel rods have been replaced, the removed parts can be reassembled by following the reversed procedure. For ease of assembly, the bottom of the apertures 23 in the plate 11 and/or the upper ends of the guide tubes may be tapered.

It will be understood that while the construction described is preferred, other ways of joining the parts together may be substituted. This applies especially to the connections between the guide tubes and end fittings. Moreover, it will be understood that the magnetic member has been described as non-circular-symmetrical with respect to the axis of rotation of the free end of the Bourdon tube, to the end that rotation of the Bourdon tube causes a change in radial position of the magnetic member that when sensed will enable determination of the amount of rotation. It will thus be clear that other shapes and positions of the magnetic member that will achieve the foregoing result are also within the contemplation of this invention. It will also be understood that fuel rods incorporating the pressure sensitive assembly of the present invention can be employed in reactor systems other than of the PWR type, as, for example, in BWRs.

As previously explained, since the rods when installed in the fuel assembly need not have identically oriented magnetic members, it is preferred to apply the probes and premeasure the electrical signal determined by the magnetic coupling at each rod to provide a basis for detecting a changed magnetic coupling. While rotation of the fuel rod itself during use is not normally encountered, as a precaution if desired, each rod can be provided with suitable keying structure so that it can occupy when installed only one radial position within its assembly. For instance, if the pressure sensitive assembly is located at the top, the bottom end of the fuel rod (not shown) can be given a non-rotational-symmetrical configuration for seating into a similarly shaped opening of the bottom end fitting. With such keyed rods, and the exercise of sufficient care in the manufacture of the Bourdon tubes, it should be possible to omit the need for premeasurement of the magnetic coupling.

While the principles of the invention have now been made clear in illustrative embodiments, there will be immediately obvious to those skilled in the art many modifications in structure, arrangement, proportions, the elements, materials, and components, used in the practice of the invention, or otherwise, which are particularly adapted for specific environments and operating requirements, without departing from those principles. The appended claims are therefore intended to cover and embrace any such modifications, within the limits only of the true spirit and scope of the invention.

What is claimed is:

1. A fuel element for a nuclear reactor comprising a sealed pressurized containment, nuclear fuel within the containment, and means located within the containment and responsive to pressure changes therein for indicating a pressure change within the containment, said pressure-responsive means comprising a sealed flexible tube curved around a central axis of the fuel element and having a free end, means for anchoring the non-free end of the sealed tube, said sealed flexible tube being pressurized to a pressure different from that of the containment, said sealed tube being configured such that the free end rotates when the containment pressure changes, and a soft magnetic member connected to the free end of the sealed tube and rotatable therewith for indicating its radial position, said magnetic member having a shape and being connected to the free end such that it is non-symmetrical with respect to the central axis.

2. A fuel element as claimed in claim 1 wherein the sealed tube is a helical Bourdon tube.

3. A fuel element as claimed in claim 1 wherein the pressure responsive means extends within a cylindrical extension at the end of the fuel element.

4. A fuel element as claimed in claim 3 wherein the indicator means comprises a magnetic member which extends within a reduced diameter portion of the cylindrical extension.

5. A fuel element as claimed in claim 1 wherein the soft magnetic member has a non-circular-symmetrical shape and is connected to the tube's free end such that it is offset with respect to the central axis.

6. A fuel element as claimed in claim 5 wherein the pressure within the sealed tube is atmospheric, and the containment pressure is above atmospheric.

7. A fuel element as claimed in claim 5 wherein the magnetic member is constituted of soft iron.

8. A fuel element as claimed in claim 7 wherein the magnetic member has a semi-circular cross-section, with the center of the semi-circle being aligned with the said central axis.

* * * * *